United States Patent Office 3,489,911
Patented Jan. 13, 1970

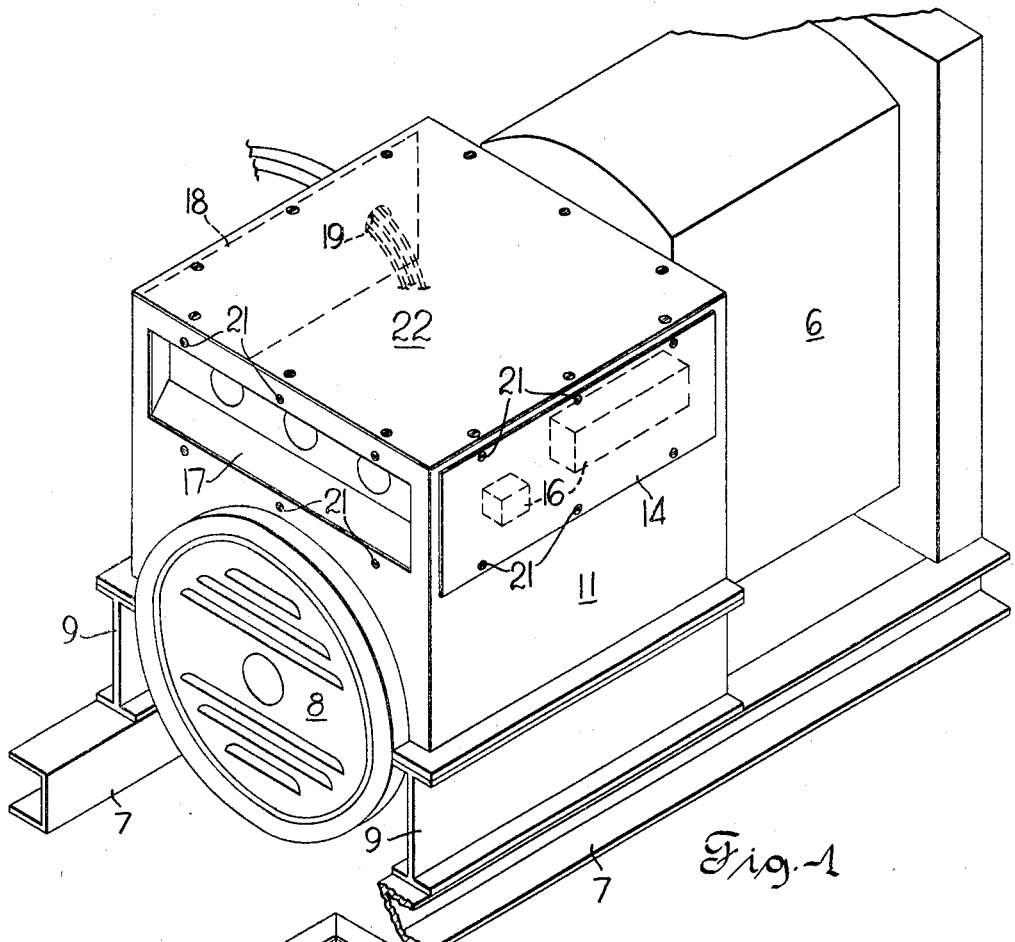
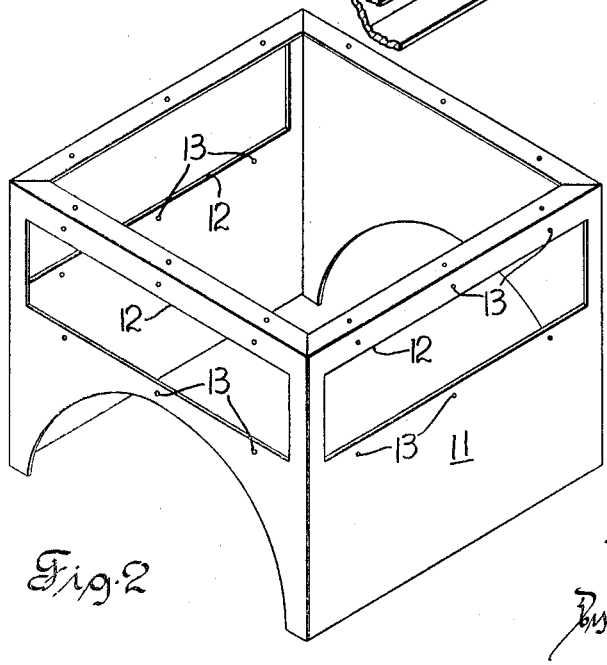

3,489,911
CONTROL MODULE FOR STANDBY POWER SET
Alan C. Varner and Paul D. Wagner, Cincinnati, Ohio, assignors to Allis-Chalmers Manufacturing Company, Milwaukee, Wis.
Filed Dec. 26, 1967, Ser. No. 693,513
Int. Cl. H05k 5/00
U.S. Cl. 290—51           1 Claim

ABSTRACT OF THE DISCLOSURE

An electric power set having a control cabinet for mounting instrument panels. The control panels and the mounting means on the cabinet are all of the same configuration so that they can be readily interchanged.

---

Electric generator sets are being used by a variety of industries such as construction, mining and logging and many others where an interruption of power cannot be tolerated. Power sets are also utilized by hospitals and by civilian and military communication systems.

One typical type of power set includes an electric generator coupled to an internal combustion engine such as a diesel engine. Operation of such a set requires control of engine speed and generator output as well as monitoring engine input and generator performance. The following is a list of the complement of controls and instruments utilized on a typical engine-generator set:

| Generator: | Engine |
|---|---|
| Voltmeter | Start switch. |
| Ammeter | Throttle. |
| Frequency and running time meter | Ether starting aid. |
| Overload trip device | Water temperature gauge. |
| Voltage adjust rheostat | Oil pressure gauge, charging ammeter, stop switch, emergency stop switch. |

The location of these controls is usually not optimized. The generator manufacturer is concerned with electrical controls and instruments and usually organizes and locates these components to best suit his design and manufacturing methods. The engine manufacturer is similarly concerned with only the engine controls and he too limits his design to conform with his manufacturing methods. However, the seller of power sets has to take into consideration the positioning of the set by the customer. Generator sets are installed in pits, corners, next to walls and between other equipment. Each installation may require a different instrument arrangement so each instrument will be visible and accessible when the set is operating. The seller thereby finds himself being required to customize the control panel for practically each different installation. This adds to the cost and complexity of the generator sets.

It is therefore a general object of this invention to design a power generating set with a control cabinet having standardized instrument mounting panels which can be arranged to satisfy the installation requirements of many different situations.

A more specific object of the subject invention is to provide a power generating set of the hereinbefore described type wherein the size and configuration of the control panels are identical so they can be interchangeably mounted at different points provided in the control cabinet.

These and other objects of the subject invention will become more fully apparent as the following description is read in light of the attached drawing, wherein:

FIG. 1 is an isometric view of an engine-generator power set having a control cabinet constructed in accordance with the invention; and, FIG. 2 is an isometric view of the cabinet with the control panel and cover plates removed.

A rotary machine such as a diesel engine generally designated 6 may be mounted on a base herein shown in the form of two skids 7 or channel irons. A generator 8 may be mounted on spaced I beams 9 which are in turn supported by the skids 7. The engine is in alignment with and connected in driving relation to the generator by any conventional means such as with a flexible shaft coupling (not shown) as is well known in the art.

A control cabinet generally designated 11 is supported about the generator 8 on the I beams 9. As herein shown the control cabinet 8 has three exposed sides with the fourth side facing and adjacent the engine 6.

Each exposed side of the cabinet 11 has a cutout 12. Each of the cutouts is identical in size and configuration. Each cutout is provided with a plurality of identically positioned and spaced internally threaded mounting holes 13. One mounting panel 14 is connected to one of the exposed sides of the cabinet about a cutout 12. This panel 14 may be provided with sufficient means to support regulating equipment indicated at 16. Another mounting panel 17 is connected to another exposed side of the cabinet 11. This panel 17 may have means to support both the machine controls and instruments. A third panel 18 is shown connected to still another of the exposed sides of the cabinet and this panel may be provided with an opening 19 to support the electrical leads.

Each of the panels 14, 17 and 18 has a general outside dimenisonal configuration which is identical. Furthermore, each panel is provided with a plurality of mounting means or screws 21 which are located to perfectly align with the mounting holes 13 in the exposed sides of the cabinet 11. With this arrangement any of the panels 14, 17 and 18 can be mounted in any of the cutouts provided in the exposed sides of the cabinet.

Naturally it would also be possible to provide an identical cutout in the top side 22 of the cabinet 11. This would permit an additional mounting for a panel.

From the above it can be seen that applicants have provided an inexpensive arrangement to permit interchangeable mounting of the controls, instruments, regulating equipment and electrical leads of a standby electric power set in the control cabinet. This not only facilitates ease of installation of the generating set to satisfy the installation requirements of the customer but drastically reduces the machining required for these different installations. An additional advantage of this arrangement is in the smaller inventory that is required in order to satisfy the customer's installation problems.

Although only one embodiment of the subject invention has been herein shown and described, other embodiments will be apparent to those skilled in the art after reading this description and it is intended that all such modifications as come within a reasonable interpretation of the appended claim be covered.

The embodiments of the invention in which an exclusive property or privilege is claimed are defined as follows:

1. In a power generating set including an electric generator machine, a rotary power producing machine connected in driving relation to said generator and regulating equipment for said machines, the improvement comprising: a control cabinet for housing said regulating equipment connected to one of said machines and positioned to include a plurality of exposed cabinet side walls, each of said exposed side walls having an opening therein; a panel covering each of said openings for mounting said regulating equipment; and identically positioned mounting means on each of said exposed side walls and said panels to permit the interchangeable mounting of any of said panels over any of said openings.

References Cited

UNITED STATES PATENTS

| 2,371,011 | 3/1945 | Womble | 290—1 |
| 2,386,597 | 9/1945 | Couse | 290—1 |
| 3,418,485 | 12/1968 | Anderson et al. | 290—1 |

G. R. SIMMONS, Primary Examiner

U.S. Cl. X.R.

174—52; 290—1, 30; 317—108